US012624235B2

(12) United States Patent
Takiguchi et al.

(10) Patent No.: US 12,624,235 B2
(45) Date of Patent: May 12, 2026

(54) NON-AQUEOUS INK JET INK COMPOSITION AND RECORDING METHOD

(71) Applicant: SEIKO EPSON CORPORATION, Tokyo (JP)

(72) Inventors: Hiroshi Takiguchi, Matsumoto (JP); Kenichiro Kubota, Matsumoto (JP); Akira Matsumoto, Shiojiri (JP)

(73) Assignee: SEIKO EPSON CORPORATION (JP)

( * ) Notice: Subject to any disclaimer, the term of this patent is extended or adjusted under 35 U.S.C. 154(b) by 524 days.

(21) Appl. No.: 18/192,719

(22) Filed: Mar. 30, 2023

(65) Prior Publication Data

US 2023/0312965 A1 Oct. 5, 2023

(30) Foreign Application Priority Data

Mar. 31, 2022 (JP) ................................. 2022-058555

(51) Int. Cl.
| | |
|---|---|
| *C09D 11/30* | (2014.01) |
| *B41J 2/01* | (2006.01) |
| *C09D 11/033* | (2014.01) |
| *C09D 11/037* | (2014.01) |
| *C09D 11/108* | (2014.01) |
| *C09D 11/32* | (2014.01) |
| *C09D 11/322* | (2014.01) |
| *C09D 11/36* | (2014.01) |

(52) U.S. Cl.
CPC ................. *C09D 11/36* (2013.01); *B41J 2/01* (2013.01); *C09D 11/033* (2013.01); *C09D 11/037* (2013.01); *C09D 11/108* (2013.01); *C09D 11/322* (2013.01)

(58) Field of Classification Search
None
See application file for complete search history.

(56) References Cited

U.S. PATENT DOCUMENTS

| | | | |
|---|---|---|---|
| 2010/0240812 A1* | 9/2010 | Yamamoto | .............. C09B 33/12 524/105 |
| 2014/0141249 A1* | 5/2014 | Tateishi | ................... C09D 7/80 534/758 |
| 2016/0237293 A1 | 8/2016 | Koike et al. | |
| 2017/0058138 A1 | 3/2017 | Kida et al. | |

FOREIGN PATENT DOCUMENTS

| | | |
|---|---|---|
| JP | 2016150984 A | 8/2016 |
| JP | 2017-043722 A | 3/2017 |
| JP | 2021-080432 A | 5/2021 |
| WO | 2021-095339 A1 | 5/2021 |

* cited by examiner

*Primary Examiner* — Michael J Feely

(74) *Attorney, Agent, or Firm* — Harness, Dickey & Pierce, P.L.C.

(57) ABSTRACT

A non-aqueous ink jet ink composition according to an embodiment of the present disclosure is an ink composition including a bright pigment, and glycol monoether A and glycol monoether B that are represented by Formula (1) and have flash points different from each other, in which the glycol ether A has a flash point of 85° C. or lower, the glycol monoether B has a flash point of 95° C. or higher, a total content of the glycol monoether A and the glycol monoether B is in a range of 20% to 60% by mass with respect to a total amount of the ink composition, and the content of the glycol monoether A is greater than the content of the glycol monoether B.

$$R_1-(O-R_2)_n-OH \qquad \text{Formula (1)}$$

(In Formula (1), $R_1$ represents an alkyl group having 1 to 8 carbon atoms or a phenyl group, $R_2$ represents an alkylene group having 1 to 5 carbon atoms, and n represents an integer of 1 to 4.)

9 Claims, 1 Drawing Sheet

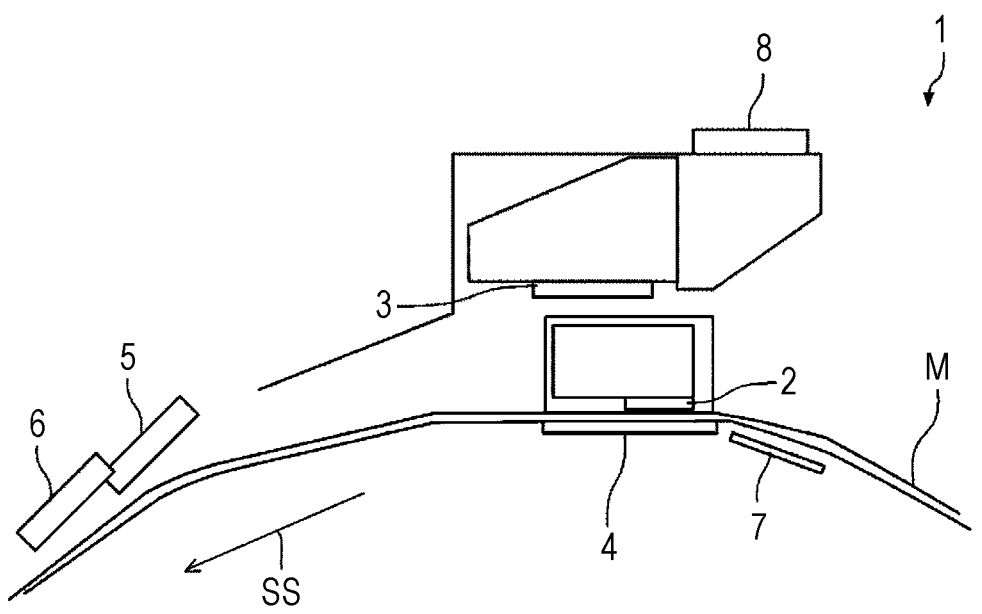

NON-AQUEOUS INK JET INK COMPOSITION AND RECORDING METHOD

The present application is based on, and claims priority from JP Application Serial Number 2022-058555, filed Mar. 31, 2022, the disclosure of which is hereby incorporated by reference herein in its entirety.

BACKGROUND

1. Technical Field

The present disclosure relates to a non-aqueous ink jet ink composition and a recording method.

2. Related Art

An ink jet recording method enables recording of a high-definition image with a relatively simple device, and thus rapid development has been made in various fields. In recent years, it has been required to apply finer liquid droplets of an ink or the like at a high density to print a higher definition image at a high speed. Under such circumstances, attempts have been made to record an image having metallic gloss, and development of a metallic ink that enables printing of an image having higher gloss has been promoted.

For example, JP2016-150984A discloses a non-aqueous ink jet ink composition that contains a bright pigment, specific glycol diether having a flash point of 70° C. or lower, and specific glycol monoether.

However, in a case where printing is performed by overlapping a color ink on an upper layer of an image formed of a metallic ink, since the glossiness of a recorded material to be obtained is still insufficient, unevenness occurs when the printing speed is increased. That is, both satisfactory glossiness and a satisfactory property of reducing unevenness cannot be achieved at the same time.

SUMMARY

According to an aspect of the present disclosure, there is provided a non-aqueous ink jet ink composition including a bright pigment, and glycol monoether A and glycol monoether B that are represented by Formula (1) and have flash points different from each other, in which the glycol ether A has a flash point of 85° C. or lower, the glycol monoether B has a flash point of 95° C. or higher, a total content of the glycol monoether A and the glycol monoether B is in a range of 20% to 60% by mass with respect to a total amount of the ink composition, and the content of the glycol monoether A is greater than the content of the glycol monoether B.

$$R_1-(O-R_2)_n-OH \qquad \text{Formula (1)}$$

(In Formula (1), $R_1$ represents an alkyl group having 1 to 8 carbon atoms or a phenyl group, $R_2$ represents an alkylene group having 1 to 5 carbon atoms, and n represents an integer of 1 to 4.)

According to another aspect of the present disclosure, there is provided a recording method including jetting the non-aqueous ink jet ink composition according to the above-described aspect using an ink jet method and making the non-aqueous ink jet ink composition adhere to a recording medium.

BRIEF DESCRIPTION OF THE DRAWING

FIGURE is a schematic view showing an example of a recording device that can be used for a recording method according to the present disclosure.

DESCRIPTION OF EXEMPLARY EMBODIMENTS

Hereinafter, embodiments of the present disclosure will be described. The embodiments below will describe examples of the present disclosure. The present disclosure is not limited to the embodiments below and includes various modifications made in a range not departing from the scope of the present disclosure. Further, not all the configurations described below are necessarily essential configurations of the present disclosure.

1. Non-Aqueous Ink Jet Ink Composition

A non-aqueous ink jet ink composition according to an embodiment of the present disclosure is a composition including a bright pigment, and glycol monoether A and glycol monoether B that are represented by Formula (1) and have flash points different from each other, in which the glycol ether A has a flash point of 85° C. or lower, the glycol monoether B has a flash point of 95° C. or higher, the total content of the glycol monoether A and the glycol monoether B is in a range of 20% to 60% by mass with respect to the total amount of the ink composition, and the content of the glycol monoether A is greater than the content of the glycol monoether B.

$$R_1-(O-R_2)_n-OH \qquad \text{Formula (1)}$$

(In Formula (1), $R_1$ represents an alkyl group having 1 to 8 carbon atoms or a phenyl group, $R_2$ represents an alkylene group having 1 to 5 carbon atoms, and n represents an integer of 1 to 4.)

In the metallic printing of the related art, the pigment size of a metallic ink is increased within a range where the ink can be jetted, and drying of the ink is intended to take time at a relatively slow printing speed. That is, since a large-sized pigment is relatively large with respect to a nozzle hole of an ink jet head, the printing stability at a high frequency is degraded, and thus the printing speed is required to be decreased. One of the reasons for this is that a metal pigment is difficult to uniformly refine to have an extremely fine size and that the productivity of a crushing step is low and thus takes an extremely long time. Further, the reason why it takes a long time to dry the ink is that since a seamless and continuous reflection surface can be formed when the pigment size is increased, high gloss can be easily obtained, but the fluidity is impaired, an ability of suitably aligning the pigment on the surface of a recording medium during drying of the ink (hereinafter, also referred to as "leafing properties" or "aligning ability") is not sufficiently high, and as a result, overlapping or the like of the pigment is unlikely to be eliminated under the condition that the ink is dried at a high speed. However, with such a method, high-speed printing cannot be performed, and the glossiness is still insufficient.

Further, in recent years, in the ink jet recording method, there is a growing demand for printing higher definition images at a high speed by applying finer liquid droplets of an ink or the like at a high density. In addition, even the metallic ink is required to have excellent glossiness in a case of high-speed printing by further reducing the size of the pigment to deal with high-definition printing, but higher glossiness than in the related art is difficult to achieve due to the following reasons.

(i) Decrease in particle diameter of pigment: When the size of the bright pigment is further reduced to deal with high-definition printing, the aspect ratio of the pigment is likely to be decreased. Such a pigment has satisfactory fluidity of each particle, but a reflection surface that is less seamless in parallel with the printing surface is difficult to form, and thus the glossiness is likely to be deteriorated. Further, even in the dispersibility, since the specific surface area relative to the weight of the particles increases, the dispersion performance is likely to be degraded when repulsion between particles weakens due to the influence of heat, moisture, or the like, the leafing is impaired by aggregation of the pigment, and therefore, the glossiness is degraded.

(ii) Expansion of recording medium due to permeation of solvent: A metallic ink typically contains a glycol ether-based solvent (further contains a polar solvent in some cases) as a solvent. Such a solvent also has an effect of swelling the surface of the recording medium and imparting adhesiveness to the ink. However, the swelling results in unevenness on the surface of the recording medium, and thus the glossiness (particularly the glossiness at a low angle, for example, 20 degrees) is likely to be degraded.

(iii) Drying speed: In high-definition printing, since ink droplets to be jetted are made to be finer, the ink is likely to be dried quickly on the recording medium, which makes it difficult to ensure a sufficient time for performing leafing. On the other hand, when printing is performed by overlapping color inks on the upper layer of an image formed of a metallic ink, particularly in a case of high-speed printing, the underlying metallic layer is required to be dried fast in order to reduce bleeding or unevenness due to the color printing of the upper layer and to reduce color mixing and dullness in the color printing due to redissolution in some cases. That is, the drying speed is required to be decreased to obtain high glossiness, but the drying speed is required to be increased to reduce the unevenness, and thus both the two cannot be achieved at the same time.

On the contrary, it was found that since the non-aqueous ink jet ink composition according to the present embodiment contains a specific amount of specific glycol monoether, the unevenness due to swelling of the recording medium is reduced while appropriate adhesiveness is maintained, the drying speed of the ink can be set to be appropriate, and high glossiness and a satisfactory property of reducing unevenness can be obtained. Since the composition contains the glycol monoether A, the influence of swelling or the like on the recording medium is suppressed while the drying properties of the ink are enhanced, and appropriate adhesiveness can not obtained. Further, the glycol monoether B satisfactorily reduces the drying properties of the ink and contributes to ensuring the time for the pigment to leaf. Further, the glycol monoether B is capable of enhancing intermittent printing stability by reducing drying of nozzles, and thus high printing accuracy can be maintained. In this manner, an appropriate drying speed can be obtained, and accordingly, high glossiness and a satisfactory property of reducing unevenness can be obtained by setting the content of the glycol ether A to be higher than the content of the glycol ether B.

In the present disclosure, "non-aqueous" denotes that the ink does not contain water as a main solvent component, which means that the ink does not contain water as a functional component for exhibiting the function or the performance of the ink. The content of water is 5% by mass or less, preferably 3% by mass or less, more preferably 1% by mass or less, particularly preferably 0.5% by mass or less, and still more preferably 0.1% by mass or less with respect to the total amount of the non-aqueous ink jet ink composition. Further, the composition may not contain water. The content of the organic solvent in the non-aqueous ink jet ink composition is preferably 50% by mass or greater and more preferably in a range of 70% to 98% by mass.

In the present disclosure, "ink jet ink composition" denotes an ink composition used for an ink jet method. Further, the ink jet method denotes a recording method of jetting liquid droplets of an ink or the like from a nozzle of an ink jet head of an ink jet recording device or the like and making the liquid droplets adhere to a recording medium. In the description below, "Ink jet ink composition" will also be referred to as "ink composition" or "ink".

1.1. Bright Pigment

The non-aqueous ink jet ink composition according to the present embodiment contains a bright pigment. The bright pigment has a function of imparting brightness to a pattern formed by adhesion of the bright pigment to a recording medium.

1.1.1 Pigment

The bright pigment is not particularly limited, and examples thereof include a metal pigment and a pearl pigment. The bright pigment may be used alone or in combination of two or more kinds thereof.

The metal pigment is not particularly limited, and examples thereof include particles of aluminum, silver, gold, platinum, nickel, chromium, tin, zinc, indium, titanium, copper, and the like, particles of alloys thereof, and mixtures thereof.

The pearl pigment is not particularly limited, and examples thereof include pigments having pearl gloss or interference gloss such as titanium dioxide-coated mica, fish scale guanine, and bismuth oxychloride.

The shape of the bright pigment is not particularly limited, and examples thereof include a flat plate shape, a spherical shape, a spindle shape, and a needle shape. Among these, a flat plate shape is preferable. When the bright pigment has a flat plate shape, the bright pigment can be disposed on the recording medium to which the ink composition has adhered such that the main surface of the bright pigment is along the surface shape of the recording medium, and thus the glossiness and the like that the bright pigment originally have can be more effectively exhibited.

In the present embodiment, "flat shape" denotes a shape in which the area when observed at a predetermined angle (in plan view) is greater than the area when observed at an angle orthogonal to the observation direction. In regard to the shape of one bright pigment, a ratio $(S_1/S_0)$ of a maximum projected area $S_1$ [$\mu$m$^2$] to a maximum orthogonal area $S_0$ [$\mu$m$^2$] is preferably 2.0 or greater, more preferably 5.0 or greater, and still more preferably 8.0 or greater. The maximum projected area is an area in plan view when observed in a direction in which the projected area is maximized. The maximum orthogonal area is an area in plan view when observed in a direction in which the area is maximized among directions orthogonal to the observation direction of the maximum projected area. As the value, for example, a value obtained by observing any ten particles, performing calculation on these particles, and averaging the calculated values can be employed.

It is preferable that the bright pigment of the present embodiment contain aluminum. When aluminum is used for the bright pigment, the glossiness of a printed image obtained by using the ink composition is excellent and the raw material cost is also inexpensive. Further, the bright pigment may contain at least aluminum and may further contain other metals.

It is preferable that the bright pigment of the present embodiment contain metal particles. The metal particle may be configured such that at least a region including the vicinity of the surface is formed of a metal or a metal alloy (hereinafter, also simply referred to as "metal"). For example, the metal particle may be configured such that the entire particle is formed of a metal or may include a core portion formed of a non-metallic material and a coating film formed of a metal covering the core portion thereof. It is preferable that the metal particle be the above-described metal pigment.

The metal particles of the bright pigment may be produced by any method. It is preferable that the metal particles be obtained by forming a film formed of a metal, for example, on one surface of a sheet-like base material using a vapor deposition method, peeling the film formed of a metal from the sheet-like base material, and crushing the film. An ion plating method or a sputtering method may be used in place of the vapor deposition method. According to this method, metal particles having a flat plate shape can be obtained, and thus the glossiness and the like that the metal particles originally have can be more effectively exhibited.

The sheet-like base material is not particularly limited, and a plastic film such as polyethylene terephthalate can be used. Further, the film deposition surface of the sheet-like base material may be coated with a release agent such as silicone oil in advance in order to improve the peeling properties, or a resin layer for peeling may be formed on the surface. The resin used for the resin layer for peeling is not particularly limited, and examples thereof include a cellulose derivative such as polyvinyl alcohol, polyvinyl butyral, polyethylene glycol, polyacrylic acid, polyacrylamide, or cellulose acetate butyrate, and a modified nylon resin. The film is peeled and crushed by, for example, irradiating the film formed of a metal with ultrasonic waves in a non-aqueous solvent and applying an external force thereto by stirring the solvent with a homogenizer or the like.

The non-aqueous solvent used for peeling and crushing the film is not particularly limited, and examples thereof include an alcohol solvent, a hydrocarbon solvent, and an ether solvent. Among these, an ether solvent is preferable. The ether solvent is not particularly limited, and examples thereof include ethylene glycol dimethyl ether, ethylene glycol diethyl ether, ethylene glycol methyl ethyl ether, diethylene glycol dimethyl ether, diethylene glycol diethyl ether, diethylene glycol methyl ethyl ether, diethylene glycol monobutyl ether acetate, diethylene glycol n-butyl ether, tripropylene glycol dimethyl ether, triethylene glycol diethyl ether, propylene glycol monomethyl ether acetate, 1,2-dimethoxyethane, bis(2-methoxyethyl)ether, p-dioxane, and tetrahydrofuran. Among these, diethylene glycol dimethyl ether, diethylene glycol diethyl ether, or diethylene glycol methyl ethyl ether is preferable, and diethylene glycol diethyl ether is more preferable.

1.1.2 Surface Treatment Agent

It is preferable that the bright pigment be a metal particle subjected to a surface treatment with a surface treatment agent. When the surface treatment is performed using a surface treatment agent, the reaction of the metal particle with water can be effectively suppressed, and a bright pigment with excellent dispersibility can be obtained. Further, the bright pigment subjected to the surface treatment with a surface treatment agent is assumed to be formed such that a moiety of a phosphorus-containing acid group of the surface treatment agent is chemically bonded to the surface of the metal particle. Here, the surface treatment agent is not limited to being bonded to the surface of the metal particle via a hydrogen bond or by an intermolecular force or the like, and a metal particle containing a residue of the surface treatment agent may be used. That is, the bright pigment subjected to the surface treatment with a surface treatment agent is considered to be formed such that the metal particle and the surface treatment agent are bonded via a covalent bond by the reaction of a OH group which can be present on the surface of the metal particle with a moiety of the phosphorus-containing acid group of the surface treatment agent. Alternatively, the surface treatment agent may be adsorbed on the surface of the metal particle by physical adsorption or the like. In this manner, the surface treatment agent is considered to be adsorbed on the metal particle via a bond or by physical adsorption or the like.

The surface treatment agent is not particularly limited, and examples thereof include a fluorine-based compound and phosphoric acid alkyl ester. Among these, it is preferable that the bright pigment be subjected to a surface treatment with phosphoric acid alkyl ester. The metal particle is easily uniformly surface-treated and a dense film can be stably formed with phosphoric acid alkyl ester. In this manner, the dispersion stability and the glossiness of the bright pigment are likely to be further enhanced.

The fluorine-based compound is not particularly limited, and examples thereof include fluorine-based phosphoric acid, fluorine-based carboxylic acid, fluorine-based sulfonic acid, fluorine-based silane, and salts thereof.

It is preferable that the phosphoric acid alkyl ester contain, for example, at least one or more selected from a compound represented by Formula (3) and a compound represented by Formula (4).

$$(R\text{—}O\text{—})P(O)(OH)_2 \qquad \text{Formula (3)}$$

$$(R\text{—}O\text{—})_2P(O)(OH) \qquad \text{Formula (4)}$$

(In the formulae, R's each independently represent a hydrocarbon group having 8 or more carbon atoms.)

The compound (mono-body) represented by Formula (3) is a compound in which one of three hydroxyl groups of phosphoric acid is esterified with an R group. Since such a mono-body has less steric hindrance, the surface of the metal particle is likely to be uniformly surface-treated, and particularly the dispersion stability or gloss of the bright pigment can be improved. The compound (di-body) represented by Formula (4) is a compound in which two of three hydroxyl groups of phosphoric acid are esterified with an R group. Such a di-body has large steric hindrance, and thus water is difficult to approach the surface of the bright pigment and particularly water resistance can be improved.

In Formula (3) and Formula (4), R represents a hydrocarbon group having a carbon skeleton with 8 or more carbon atoms, which is a hydrocarbon group having a skeleton formed by 8 or more carbon atoms being continuously bonded. Further, in Formula (3) and Formula (4), any carbon atom of the carbon skeleton with 8 or more carbon atoms of R is directly bonded to an oxygen atom of O in (R—O—), and the oxygen atom is directly bonded to a phosphorus atom of P.

Therefore, it is assumed that when the surface treatment agent reacts with the metal particles at a moiety of the hydroxyl group bonded to the phosphorus atom of the surface treatment agent so that the metal particles are surface-modified, R can be present at a position relatively close to the metal particles and the dispersion stability of the bright pigment can be improved.

Further, it is assumed that excellent dispersion stability can be imparted to the bright pigment when R represents a relatively long-chain hydrocarbon group.

Examples of the hydrocarbon group having a carbon skeleton with 8 or more carbon atoms include a saturated hydrocarbon group having no double bond nor triple bond between carbon atoms and an unsaturated hydrocarbon group having a double bond or a triple bond between carbon atoms. The hydrocarbon group as R may be an aromatic hydrocarbon group in which the carbon skeleton has an aromatic ring structure or a chain-like or cyclic aliphatic hydrocarbon group. Particularly, the chain-like aliphatic hydrocarbon group is preferable from the viewpoint that the dispersion stability or the like is more excellent. The chain-like aliphatic hydrocarbon group may be branched or linear and is preferably linear from the viewpoint that the dispersion stability, the jetting stability, the gloss, and the like are more excellent. In this case, for example, it is assumed that since the surface of the metal particle can be modified with a plurality of phosphoric acid alkyl esters, the effects are sufficiently exhibited.

R represents a hydrocarbon group and thus has a bond of a carbon atom and a hydrogen atom. R represents a hydrocarbon group consisting of a carbon atom and a hydrogen atom when R does not have a substituent. When R represents a chain-like aliphatic hydrocarbon group, examples thereof include an alkyl group, an alkenyl group, and an alkynyl group. In this case, particularly, it is preferable that the ink be a non-aqueous ink from the viewpoint that the dispersion stability is more excellent.

R represents a hydrocarbon group having a carbon skeleton with 8 or more carbon atoms and has carbon atoms and hydrogen atoms, and may have at least a bond between the carbon atoms and the hydrogen atoms. Therefore, some hydrogen atoms that the hydrocarbon group as R may have may be substituted with a substituent, and the hydrocarbon group may have one or more unsubstituted hydrogen atoms.

Examples of the substituent include a carboxyl group, a hydroxyl group, an amino group, an oxyalkylene-containing group, and a halogeno group such as a fluoro group. Particularly when some hydrogen atoms are substituted with a fluoro group and the like, higher hydrophobicity can be imparted to the bright pigment, which is more preferable from the viewpoints of the water resistance and the glossiness. Further, the oxyalkylene-containing group is a group having an oxyalkylene structure, and the oxyalkylene structure is also referred to as an alkylene oxide structure.

When some hydrogen atoms that the hydrocarbon group as R may have are substituted with a substituent, the number of substituents is preferably 50% or less and more preferably 10% or less of the number of hydrogen atoms of the hydrocarbon group in a case where R does not have a substituent. Further, the number of substituents is preferably 5 or less, particularly preferably 3 or less, still more preferably 2 or less, and even still more preferably 1 or less. Further, the number of substituents is 0 or greater, and the lower limit of the number of substituents when some hydrogen atoms are substituted with a substituent is 1 or greater. From the viewpoint that the dispersion stability is likely to be further improved, it is preferable that the substituent be provided on the carbon atom at the position farthest from the phosphorus atom in the formulae.

It is preferable that the compound represented by Formula (3) and the compound represented by Formula (4) be hydrocarbon groups having 10 or more carbon atoms as R in the formulae. Further, a hydrocarbon group having 12 to 30 carbon atoms as R in the formulae is more preferable.

Further, the number of carbon atoms of the hydrocarbon group as R in the formulae is more preferably in a range of 12 to 25, still more preferably in a range of 12 to 23, even still more preferably in a range of 14 to 22, particularly preferably in a range of 15 to 20, and more particularly preferably in a range of 17 to 20. The number of carbon atoms of the hydrocarbon group as R in the formulae is particularly in a range of 15 to 20 and preferably in the above-described ranges, the water resistance and the glossiness are likely to be further improved.

Further, R's in Formula (3) and Formula (4) represent preferably hydrocarbon groups having the same number of carbon atoms and more preferably the same hydrocarbon group. With such R, phosphoric acid alkyl ester is assumed to uniformly adhere onto the surface of the metal particle, and the water resistance and the glossiness are likely to be enhanced in a well-balanced manner.

Further, R's in Formula (3) and Formula (4) represent any of an alkyl group, an alkenyl group, or an alkynyl group and more preferably a carbon skeleton having 10 or more carbon atoms. In this case, a carbon skeleton having 10 or more and 30 or less carbon atoms is preferable. Further, the number of carbon atoms in the carbon skeleton is preferably 10 or more and 25 or less, more preferably 12 or more and 23 or less, still more preferably 14 or more and 21 or less, and particularly preferably 16 or more and 19 or less. When R's represent any of an alkyl group, an alkenyl group, or an alkynyl group and the number of carbon atoms is in the above-described ranges, the dispersion stability and the glossiness are likely to be further improved.

Specific examples of the compound (mono-body) represented by Formula (3) include phosphoric acid monooctyl ester, phosphoric acid monolauryl ester, phosphoric acid monoisotridecyl ester, and phosphoric acid monostearyl ester. Among these, one or more selected from these are preferable, one or more selected from phosphoric acid monoisotridecyl ester, and phosphoric acid monostearyl ester are preferable, and phosphoric acid monostearyl ester is still more preferable.

Specific examples of the compound (di-body) represented by Formula (4) include phosphoric acid dioctyl ester, phosphoric acid dilauryl ester, phosphoric acid diisotridecyl ester, and phosphoric acid distearyl ester. Among these, one or more selected from these are preferable, one or more selected from phosphoric acid diisotridecyl ester and phosphoric acid distearyl ester are more preferable, and phosphoric acid distearyl ester is still more preferable.

The surface treatment on the metal particles with the surface treatment agent may be performed, for example, by allowing a liquid to contain the surface treatment agent when a metal film formed by a vapor deposition method is crushed in the liquid to form the metal particles.

The content of the surface treatment agent is preferably in a range of 1% to 100% by mass, more preferably in a range of 1% to 70% by mass, still more preferably in a range of 1% to 50% by mass, even still more preferably in a range of 2% to 40% by mass, particularly preferably in a range of 4% to 30% by mass, more particularly preferably in a range of 6% to 20% by mass, and still more preferably in a range of 8% to 15% by mass with respect to 100% by mass of the total mass of the metal particles.

When the surface treatment is performed with the compound represented by Formula (3) as the phosphoric acid alkyl ester, the content of the compound is preferably in a range of 0.5% to 90% by mass, more preferably in a range of 0.5% to 70% by mass, still more preferably in a range of 1% to 50% by mass, even still more preferably in a range of 2% to 30% by mass, particularly preferably in a range of 3% to 20% by mass, and more particularly preferably in a range of 4% to 15% by mass with respect to 100% by mass of the total mass of the metal particles. When the content of the compound represented by Formula (3) with respect to 100% by mass of the total mass of the metal particles is in the above-described ranges, the dispersion stability and the gloss of the bright pigment are likely to be further improved.

When the surface treatment is performed with the compound represented by Formula (4) as the phosphoric acid alkyl ester, the content of the compound is preferably in a range of 0.05% to 30% by mass, more preferably in a range of 0.1% to 25% by mass, still more preferably in a range of 1% to 20% by mass, even still more preferably in a range of 2% to 15% by mass, and particularly preferably in a range of 3% to 10% by mass with respect to 100% by mass of the total mass of the metal particles. When the content of the compound represented by Formula (4) with respect to 100% by mass of the total mass of the metal particles is in the above-described ranges, the water resistance is likely to be further improved.

1.1.3 Physical Properties and the Like

It is preferable that the bright pigment have a volume average particle diameter (D50) of 0.5 µm or less and an average thickness of 30 nm or less. Further, the aspect ratio (volume average particle diameter (D50)/average thickness) of the bright pigment is preferably in a range of 15 to 60, more preferably in a range of 20 to 50, and still more preferably in a range of 30 to 40. Since such a bright pigment has poor leafing properties and the dispersibility thereof is likely to be degraded, the glossiness is likely to be deteriorated. However, according to the non-aqueous ink jet ink composition according to the present embodiment, satisfactory glossiness can be obtained even with such a bright pigment.

The lower limit of the volume average particle diameter (D50) of the bright pigment is not particularly limited, but is preferably 0.10 µm or greater, more preferably 0.20 µm or greater, still more preferably 0.25 µm or greater, and particularly preferably 0.30 µm or greater. Further, the upper limit of the volume average particle diameter (D50) of the bright pigment is not particularly limited, but may be 5.00 µm or less, 3.00 µm or less, 1.00 µm or less, or 0.70 µm or less and is preferably 0.55 µm or less.

In the present disclosure, "volume average particle diameter (D50)" denotes the median diameter of the volume distribution obtained by measuring a bright pigment dispersion liquid using a laser diffraction scattering method and is the size of particles showing exactly 50% of the median value as an accumulation when a plurality of measurement results are expressed as an accumulation of the abundance ratio for each size. Further, in a case where the bright pigment has a flat plate shape, the volume average particle diameter is acquired based on the shape and the size of the bright particles when the shape of the metal particles is converted into a spherical shape.

The lower limit of the average thickness of the bright pigment is not particularly limited, but is preferably 5 nm or greater, more preferably 7 nm or greater, still more preferably 9 nm or greater, particularly preferably 11 nm or greater, and more particularly preferably 13 nm or greater. Further, the upper limit of the average thickness of the bright pigment is not particularly limited, but may be 60 nm or less or 40 nm or less and is preferably 25 nm or less, more preferably 23 nm or less, still more preferably 21 nm or less, particularly preferably 19 nm or less, and more particularly preferably 17 nm or less. The average thickness of the bright pigment is particularly preferably 15 nm.

Further, the average thickness of the bright pigment can be measured using an atomic force microscope (AFM). The measurement is not limited, but the average thickness can be measured by an atomic force microscope using NanoNaviE-Sweep (manufactured by SII Nano Technology Inc.). For example, an average value obtained by measuring any 50 particles of the bright pigment is defined as the average thickness. That is, it is preferable that the average thickness be an arithmetic average thickness.

The lower limit of the content of the bright pigment is preferably 0.1% by mass or greater, more preferably 0.3% by mass or greater, still more preferably 0.5% by mass or greater, particularly preferably 0.7% by mass or greater, and more particularly preferably 0.9% by mass or greater with respect to the total mass of the ink composition. The upper limit of the content of the bright pigment is preferably 10% by mass or less, more preferably 5% by mass or less, still more preferably 2% by mass or less, particularly preferably 1.7% by mass or less, and more particularly preferably 1.4% by mass or less with respect to the total mass of the ink composition. When the content of the bright pigment is in the above-described ranges, the glossiness and the rub resistance of a colored portion formed of the ink composition can be particularly improved while the storage stability, the water resistance, and the like of the ink composition are further improved.

1.2 Glycol Monoether

The non-aqueous ink jet ink composition according to the present embodiment contains glycol monoether A and glycol monoether B which are represented by Formula (1) and have flash points different from each other.

$$R_1—(O—R_2)_n—OH \qquad \text{Formula (1)}$$

(In Formula (1), $R_1$ represents an alkyl group having 1 to 8 carbon atoms or a phenyl group, $R_2$ represents an alkylene group having 1 to 5 carbon atoms, and n represents an integer of 1 to 4.)

$R_1$ and $R_2$ in Formula (1) may be branched or linear. $R_1$ represents a methyl group, an ethyl group, an n-propyl group, an iso-propyl group, an n-butyl group, a sec-butyl group, a tert-butyl group, or the like. $R_2$ represents a methylene group, an ethylene group (dimethylene), a propylene group (trimethylene or methyl ethylene), a butylene group, or the like.

Here, "flash point" is defined in JIS K 2265 as "temperature obtained by correcting, based on the atmospheric pressure, the minimum temperature of sample vapor which emits a flash and burns instantaneously and in which the flash propagates on the liquid surface when an ignition source is made to approach the sample vapor under specified conditions, to a value of 101.3 kPa". That is, the flash point is defined based on ease of volatilization of the sample and ease of ignition of gas after volatilization in consideration of the vapor pressure at a lower temperature. On the contrary, the normal boiling point is a boiling point under a pressure of 1 atm in consideration of the vapor pressure at a higher temperature. Experiments have recently confirmed that the drying speed of a liquid has a higher correlation with the flash point than with the normal boiling point. The reason for this is assumed to be that the relationship (inclination) between the vapor pressure at a low temperature and the vapor pressure at a high temperature varies depending on the compound and the temperature in the printing process is a lower temperature of approximately 23° C. to 40° C., and thus the flash point closer to the temperature in the printing process has a higher correlation with the drying speed.

Further, the flash point is preferably measured by a Cleveland open flash point tester when the flash point obtained by a tag closed flash point tester is higher than 80° C., preferably measured by a tag closed flash point tester when the flash point obtained by a tag closed flash point tester is 80° C. or lower and the kinematic viscosity of a solvent at the flash point is less than 10 cSt, and preferably measured by a Seta closed flash point tester when the kinematic viscosity of a solvent at the flash point is 10 cSt or higher.

1.2.1 Glycol Monoether A

The glycol monoether A contained in the non-aqueous ink jet ink composition according to the present embodiment has a flash point of 85° C. or lower and is preferably represented by Formula (1)'.

$$R_1—(O—R_2)_n—OH \qquad \text{Formula (1)'}$$

(In Formula (1)', $R_1$ represents an alkyl group having 1 to 4 carbon atoms, $R_2$ represents an alkylene group having 1 to 5 carbon atoms, and n represents an integer of 1 to 4.)

The glycol monoether A is capable of suppressing influence of swelling or the like on the recording medium while satisfactorily increasing the drying properties of the ink so that moderate adhesiveness can be obtained.

The lower limit of the flash point of the glycol monoether A is not particularly limited, but is, for example, preferably 30° C. or higher, more preferably 50° C. or higher, still more preferably 60° C. or higher, and particularly preferably 70° C. or higher. The upper limit of the flash point of the glycol monoether A is preferably 83° C. or lower and more preferably 80° C. or lower. When the flash point thereof is in the above-described ranges, more satisfactory glossiness can be obtained in some cases.

$R_2$ in Formula (1)' representing the glycol monoether A represents preferably an alkylene group having 2 or 3 carbon atoms and more particularly preferably an alkylene group having 3 carbon atoms. In a case of such glycol monoether A, the influence of swelling or the like on the recording medium can be reduced, and thus more satisfactory glossiness is likely to be obtained. Further, the dispersibility of the bright pigment can be enhanced.

$R_1$ in Formula (1)' representing the glycol monoether A represents preferably an alkyl group having 1 or 2 carbon atoms and more preferably an alkyl group having 1 carbon atom. In a case of such glycol monoether A, more satisfactory glossiness and a more satisfactory property of reducing unevenness can be obtained in some cases.

n in Formula (1)' representing the glycol monoether A represents preferably 1 to 3, more preferably 1 or 2, and still more preferably 2. In a case of such glycol monoether A, more satisfactory glossiness and a more satisfactory property of reducing unevenness can be obtained in some cases.

A specific compound of the glycol monoether A is not particularly limited, and examples thereof include methylene glycol monobutyl ether (BMG, 63° C.), ethylene glycol monoisopropyl ether (44° C.), ethylene glycol monoethyl ether (43° C.), ethylene glycol monobutyl ether (60° C.), ethylene glycol monomethyl ether (41° C.), propylene glycol monobutyl ether (BPG, 61.5° C.), diethylene glycol monoethyl ether (86° C.), diethylene glycol monobutyl ether (78° C.), diethylene glycol monomethyl ether (93° C.), dipropylene glycol monomethyl ether (MFDG, 79° C.), propylene glycol monoethyl ether (38.5° C.), propylene glycol monomethyl ether (36° C.), and 3-methoxy-3-methyl butanol (MMB, 68° C.) (the values in the parentheses denote the flash points). Among these, as the glycol monoether A, one or more selected from methylene glycol monobutyl ether, propylene glycol monobutyl ether, dipropylene glycol monomethyl ether, and 3-methoxy-3-methyl butanol are preferable, and dipropylene glycol monomethyl ether is particularly preferable. In a case of such glycol monoether A, the influence of swelling or the like on the recording medium can be further suppressed while the drying properties of the ink are more satisfactorily increased, and thus more moderate adhesiveness is likely to be obtained.

The content of the glycol monoether A is preferably in a range of 15% to 55% by mass, more preferably in a range of 15% to 40% by mass, still more preferably in a range of 15% to 30% by mass, particularly preferably in a range of 15% to 25% by mass with respect to the total amount of the ink composition. When the content of the glycol monoether A is in the above-described ranges, more satisfactory glossiness and a more satisfactory property of reducing unevenness are likely to be obtained.

1.2.2 Glycol Monoether B

The glycol monoether B contained in the non-aqueous ink jet ink composition according to the present embodiment has a flash point of 95° C. or greater and is preferably represented by Formula (1)".

$$R_1—(O—R_2)_n—OH \qquad \text{Formula (1)''}$$

(In Formula (1)", $R_1$ represents an alkyl group having 1 to 8 carbon atoms or a phenyl group, $R_2$ represents an alkylene group having 1 to 4 carbon atoms, and n represents an integer of 1 to 4.)

The glycol monoether B is a solvent that is relatively unlikely to be dried and contributes to ensuring the time for the pigment to leaf by satisfactorily decreasing the drying properties of the ink.

The upper limit of the flash point of the glycol monoether B is not particularly limited, but is, for example, preferably 200° C. or lower, more preferably 180° C. or lower, still more preferably 170° C. or lower, and particularly preferably 160° C. or lower. The lower limit of the flash point of the glycol monoether A is preferably 110° C. or higher, more preferably 120° C. or higher, still more preferably 130° C. or higher, particularly preferably 140° C. or higher, and more particularly preferably 150° C. or higher. When the flash point thereof is in the above-described ranges, more satisfactory glossiness can be obtained in some cases.

$R_1$ in Formula (1)" representing the glycol monoether B represents preferably an alkyl group having 1 or 2 carbon atoms and more preferably an alkyl group having 1 carbon atom. In a case of such glycol monoether B, more satisfactory glossiness and a more satisfactory property of reducing unevenness can be obtained in some cases.

$R_2$ in Formula (1)" representing the glycol monoether B represents preferably an alkylene group having 2 or 3 carbon atoms and more particularly preferably an alkylene group having 2 carbon atoms. In a case of such glycol monoether B, more satisfactory glossiness and a more satisfactory property of reducing unevenness can be obtained in some cases.

n in Formula (1)" representing the glycol monoether B represents preferably 2 to 4, more preferably 3 or 4, and still more preferably 4. In a case of such glycol monoether B, more satisfactory glossiness and a more satisfactory property of reducing unevenness can be obtained in some cases.

A specific compound of the glycol monoether B is not particularly limited, and examples thereof include diethylene glycol ethyl hexyl ether (EHDG, 136.7° C.), dipropylene glycol monobutyl ether (BFDG, 100° C.), dipropylene glycol phenyl ether (PhDG, 140.9° C.), tetraethylene glycol monomethyl ether (MtetG, 126° C.), tetraethylene glycol monobutyl ether (BTGH, 156° C.), triethylene glycol monomethyl ether (MTG, 95.3° C.), triethylene glycol monoethyl ether (135° C.), triethylene glycol monobutyl ether (143° C.), and tripropylene glycol monomethyl ether (MFTG, 117.6° C.) (the values in the parentheses denote the flash points). Among these, as the glycol monoether B, one or more selected from diethylene glycol ethyl hexyl ether, dipropylene glycol phenyl ether, tetraethylene glycol monomethyl ether, tetraethylene glycol monobutyl ether, triethylene glycol monomethyl ether, and tripropylene glycol monomethyl ether are preferable, and tetraethylene glycol monobutyl ether is particularly preferable. When the glycol monoether B is tetraethylene glycol monobutyl ether, the leafing properties are further enhanced, and the glossiness can be further improved. This is because the tetraethylene glycol monobutyl ether has a relatively high polarity and thus can be more preferably leafed when interacting with the surface of the bright pigment with a low surface free energy. Further, the tetraethylene glycol monobutyl ether has less influence on the recording medium and thus is difficult to swell the recording medium, and accordingly, degradation of the glossiness due to unevenness of the surface can be suppressed.

The content of the glycol monoether B is preferably in a range of 5% to 15% by mass, more preferably in a range of 8% to 13% by mass, and still more preferably in a range of 9% to 12% by mass with respect to the total amount of the ink composition. When the content of the glycol monoether B is in the above-described ranges, more satisfactory glossiness and a more satisfactory property of reducing unevenness are likely to be obtained.

1.2.3 Content

The total content of the glycol monoether A and the glycol monoether B in the non-aqueous ink jet ink composition according to the present embodiment is in a range of 20% to 60% by mass with respect to the total amount of the ink composition. The content of the glycol monoether A is greater than the content of the glycol monoether B.

When the ink composition contains the glycol monoether A and the glycol monoether B in specific amounts, the unevenness due to swelling of the recording medium is reduced while moderate adhesiveness is maintained, the drying speed of the ink is set to be appropriate, and high glossiness and a satisfactory property of reducing unevenness can be obtained.

The total content of the glycol monoether A and the glycol monoether B is preferably in a range of 20% to 55% by mass, more preferably in a range of 20% to 50% by mass, still more preferably in a range of 20% to 45% by mass, even still more preferably in a range of 20% to 40% by mass, particularly preferably in a range of 23% to 40% by mass, and more preferably in a range of 25% to 35% by mass with respect to the total amount of the ink composition. When the total content thereof is in the above-described ranges, higher glossiness and a satisfactory property of reducing unevenness are likely to be obtained.

The content of the glycol monoether A is greater than the content of the glycol monoether B by preferably 0.5% by mass or greater, more preferably 1% by mass or greater, still more preferably 3% by mass or greater, even still more preferably 5% by mass or greater, particularly preferably 7% by mass or greater, and more particularly preferably 9% by mass or greater with respect to the total amount of the ink composition. The upper limit thereof is not particularly limited, but the content of the glycol monoether A is greater than the content of the glycol monoether B by preferably 50% by mass or less, more preferably 40% by mass or less, still more preferably 30% by mass or less, even still more preferably 25% by mass or less, particularly preferably 20% by mass or less, and more particularly preferably 15% by mass or less. When the content of the glycol monoether A and the content of the glycol monoether B are in the above-described relationship, higher glossiness and a satisfactory property of reducing unevenness are likely to be obtained.

The ratio (A/B) of the content of the glycol monoether A to the content of the glycol monoether B in terms of mass is preferably 1.1 or greater, more preferably 1.3 or greater, still more preferably 1.5 or greater, and particularly preferably 1.8 or greater. The upper limit thereof is not particularly limited, but is, for example, preferably 6.0 or less, more preferably 5.0 or less, still more preferably 4.0 or less, particularly preferably 3.0 or less, and more particularly preferably 2.5 or less. When such a mass ratio (A/B) is in the above-described ranges, higher glossiness and a satisfactory property of reducing unevenness are likely to be obtained.

1.3 Other Solvents 1.3.1 Glycol Diether

It is preferable that the non-aqueous ink jet ink composition according to the present embodiment further contain glycol diether represented by Formula (2).

$$R_3O-(R_4O)_m-R_5 \qquad \text{Formula (2)}$$

(In Formula (2), $R_3$ and $R_5$ each independently represent an alkyl group having 1 to 4 carbon atoms, $R_4$ represents an alkylene group having 2 or 3 carbon atoms, and m represents an integer of 1 to 4.)

$R_3$, $R_4$, and $R_5$ in Formula (2) may be branched or linear. $R_3$ and $R_5$ may represent, for example, a methyl group, an ethyl group, an n-propyl group, an iso-propyl group, an n-butyl group, a sec-butyl group, or a tert-butyl group. $R_4$ may represent, for example, an ethylene group (dimethylene) or a propylene group (trimethylene or methyl ethylene).

Since the glycol diether has moderate drying properties and less effect on the recording medium, higher glossiness and a satisfactory property of reducing unevenness are likely to be obtained when the ink composition contains the glycol diether. Further, the glycol diether is advantageous in that the intermittent printing stability in jetting of the ink using an ink jet method is likely to be ensured and the glycol diether has a low odor.

The flash point of the glycol diether is not particularly limited, but is preferably 50° C. or higher, more preferably 60° C. or higher, still more preferably 65° C. or higher, and particularly preferably 70° C. or higher.

A specific compound of the glycol diether is not particularly limited, and examples thereof include glycol diethyl ether (35° C.), ethylene glycol dimethyl ether (−6° C.), diethylene glycol methyl ethyl ether (63° C.), diethylene glycol dimethyl ether (56° C.), diethylene glycol diethyl ether (DEDG, 71° C.), dipropylene glycol dimethyl ether (65° C.), and propylene glycol dimethyl ether (6.5° C.) (the values in the parentheses denote the flash points). The glycol diether may be used alone or in combination of two or more kinds thereof. As the glycol diether represented by Formula (2), diethylene glycol diethyl ether is preferable.

The content of the glycol diether represented by Formula (2) is preferably in a range of 35% to 75% by mass, more preferably in a range of 45% to 70% by mass, still more preferably in a range of 50% to 70% by mass, and particularly preferably in a range of 55% to 70% by mass with respect to the total amount of the ink composition. When the content of the glycol diether represented by Formula (2) is in the above-described ranges, higher glossiness and a satisfactory property of reducing unevenness are likely to be obtained.

1.3.2 Cyclic Ester

It is preferable that the non-aqueous ink jet ink composition according to the present embodiment further contain a cyclic ester. The cyclic ester has a high affinity for the surface of the recording medium (for example, a vinyl chloride-based resin), and thus the adhesiveness of the ink to the recording medium can be further improved. In this manner, an image with more excellent friction fastness can be obtained. Meanwhile, when the ink composition contains a cyclic ester, unevenness is likely to be generated on the surface of the recording medium due to swelling, and thus the glossiness is likely to be degraded. However, according to the non-aqueous ink jet ink composition according to the present embodiment, the unevenness generated due to swelling of the recording medium can be reduced so that satisfactory glossiness can be maintained when the ink composition contains a cyclic ester.

The cyclic ester is a compound having a structure in which a hydroxyl group and a carboxyl group are dehydrated and condensed in one molecule containing a hydroxyl group and a carboxyl group. The cyclic ester is a compound that has a heterocyclic ring having two carbon atoms and one oxygen atom and has a structure in which a carbonyl group is disposed adjacent to the oxygen atom forming the heterocyclic ring, and such compounds are collectively referred to as lactones.

Examples of the cyclic ester include γ-butyrolactone (GBL), γ-valerolactone, γ-hexalactone, γ-heptalactone, γ-octalactone, γ-nanolactone, γ-decalactone, γ-undecalactone, δ-valerolactone, δ-hexalactone, δ-heptalactone, δ-octalactone, δ-nonalactone, δ-decalactone, δ-undecalactone, and δ-caprolactam. Further, the number of ring members of the heterocyclic ring of the cyclic ester is not particularly limited, and for example, any side chains may be bonded to the ring members of the heterocyclic ring. The cyclic ester may be used alone or in a mixture of two or more kinds thereof.

Among the examples of the cyclic ester described above, a 3-membered or higher membered and 7-membered or lower membered cyclic ester is preferable, and a 5-membered or 6-membered cyclic ester is more preferable. In both cases, it is more preferable that the cyclic esters do not have side chains. Specific examples of such cyclic esters include γ-butyrolactone and δ-valerolactone.

When the ink composition contains a cyclic ester, the content of the cyclic ester is preferably in a range of 1% to 15% by mass, more preferably in a range of 2% to 10% by mass, and still more preferably in a range of 3% to 8% by mass with respect to the total mass of the ink composition. When the content of the cyclic ester is in the above-described ranges, satisfactory glossiness is likely to be obtained while moderate adhesiveness is maintained.

1.3.3 Other Solvents

The non-aqueous ink jet ink composition according to the present embodiment may contain solvents such as alcohols, ketones, carboxylic acid esters, ethers, alkanediols, polyhydric alcohols, or amines as solvents other than the solvents described above.

Examples of the alcohols include methyl alcohol, ethyl alcohol, propyl alcohol, butyl alcohol, isopropyl alcohol, and fluoroalcohol.

Examples of the ketones include acetone, methyl ethyl ketone, and cyclohexanone.

Examples of the carboxylic acid esters include methyl acetate, ethyl acetate, propyl acetate, butyl acetate, methyl propionate, and ethyl propionate.

Examples of the ethers include diethyl ether, dipropyl ether, tetrahydrofuran, and dioxane.

Examples of the alkanediols include compounds in which an alkane is substituted with two hydroxyl groups. Examples of the alkanediols include ethylene glycol (also referred to as ethane-1,2-diol), propylene glycol (also referred to as propane-1,2-diol), 1,2-butanediol, 1,2-pentanediol, 1,2-hexanediol, 1,2-octanediol, 1,3-propanediol, 1,3-butylene glycol, 1,4-butanediol, 2,3-butanediol, 1,2-pentanediol, 1,5-pentanediol, 2,4-pentanediol, 2-methyl-1,3-propanediol, 3-methyl-1,3-butanediol, 3-methyl-1,5-pentanediol, 2-ethyl-1,3-hexanediol, 2-methyl-1,3-pentanediol, 3-methyl-1,5-pentanediol, 2-methylpentane-2,4-diol, 1,6-hexanediol, 2-ethyl-2-methyl-1,3-propanediol, and 2-methyl-2-propyl-1,3-propanediol.

Examples of the polyhydric alcohols include diethylene glycol, triethylene glycol, polyethylene glycol, polypropylene glycol, butylene glycol, 1,2,6-hexanetriol, thioglycol, hexylene glycol, glycerin, trimethylolethane, and trimethylolpropane.

Examples of the amines include hydroxylamine such as triethanolamine, tripropanolamine, tributanolamine, N,N-dimethyl-2-aminoethanol, or N,N-diethyl-2-aminoethanol.

Examples of other solvents include higher fatty acid ester such as methyl laurate, isopropyl hexadecanoate (isopropyl palmitate), isopropyl myristate, methyl oleate, or ethyl oleate, dibasic acid diester in which aliphatic hydrocarbon dicarboxylic acid having 2 to 8 carbon atoms (the number of carbon atoms does not include the number of carbon atoms in the carboxyl group) is diesterified with an alkyl group having 1 to 5 carbon atoms, and alkylamide (N,N-dimethyldecanamide or the like) in which aliphatic hydrocarbon monocarboxylic acid having 6 to 10 carbon atoms (the number of carbon atoms does not include the number of carbon atoms in the carboxyl group) is amidated (substituents substituting amide nitrogen atoms are each independently a hydrogen atom and an alkyl group having 1 to 4 carbon atoms).

1.4 Resin

It is preferable that the non-aqueous ink jet ink composition according to the present embodiment further contain an acrylic resin. An acrylic resin is less affected by degradation of glossiness. The reason for this is assumed to be that the leafing properties are improved due to a relatively high increase in viscosity when an acrylic resin is dissolved in a solvent. Therefore, when the ink composition contains an acrylic resin, the rub resistance is likely to be improved while high glossiness is maintained.

Examples of the acrylic resin include poly(meth)acrylic acid, polymethyl (meth)acrylate, polyethyl (meth)acrylate, a (meth)acrylic acid-(meth)acrylic acid ester copolymer, a styrene-(meth)acrylic copolymer resin, an ethylene-(meth)acrylic acid copolymer resin, an ethylene alkyl (meth)acrylate resin, and an ethylene-(meth)acrylic acid ester copolymer resin.

In the present specification, "(meth)acryl" denotes acryl or methacryl, and "(meth)acrylate" denotes acrylate or methacrylate.

A commercially available product may be used as the acrylic resin, and examples thereof include ACRYPET (trade name, manufactured by Mitsubishi Rayon Co., Ltd., acrylic resin), SUMIPEX LG (trade name, manufactured by Sumitomo Chemical Co., Ltd., acrylic resin), PARALOID B Series such as PARALOID B60 (trade name, manufactured by Dow Chemical Company, acrylic resin), and PARAPET G-1000P (trade name, manufactured by Kuraray Co., Ltd., acrylic resin).

When the ink composition contains an acrylic resin, the content of the acrylic resin is preferably in a range of 0.05% to 1.00% by mass, more preferably in a range of 0.10% to 0.70% by mass, still more preferably in a range of 0.15% to 0.40% by mass, and particularly preferably in a range of 0.20% to 0.30% by mass with respect to the total mass of the ink composition. When the content of the acrylic resin is in the above-described ranges, the rub resistance is likely to be improved while high glossiness is further maintained.

The non-aqueous ink jet ink composition according to the present embodiment may contain a resin other than the acrylic resin, and examples of such a resin include a vinyl chloride-based resin, aliphatic polyester, aromatic polyester, polyurethane, an epoxy resin, polyvinyl acetate, an ethylene-vinyl acetate copolymer resin, polycarbonate, polyvinyl butyral, a phenoxy resin, an ethyl cellulose resin, a cellulose acetate propionate resin, cellulose acetate butyrate, a nitro-cellulose resin, polystyrene, a vinyl toluene-α-methylsty-rene copolymer resin, polyamide, polyimide, a polysulfone-based resin, a petroleum resin, chlorinated polypropylene, polyolefin, a terpene-based resin, a rosin-modified phenol resin, various synthetic rubbers such as NBR, SBR, and MBR, and modified products thereof. These resins may be used alone or in a mixture of two or more kinds thereof.

1.5 Surface Adjusting Agent

It is preferable that the non-aqueous ink jet ink composition according to the present embodiment further contain a surface adjusting agent. The surface adjusting agent has a function of improving the lubricity of the printing surface and further enhancing the friction fastness. The surface adjusting agent is also referred to as a slipping agent.

As the surface adjusting agent, a silicone-based surfactant is preferable, and a modified silicone-based compound such as polyester-modified silicone or polyether-modified silicone is more preferable. Examples of the polyester-modified silicone include BYK-347, 348, BYK-UV3500, 3510, and 3530 (all manufactured by BYK Additives & Instruments), and examples of the polyether-based silicone include BYK-333 and 3570 (both manufactured by BYK Additives & Instruments).

When the ink composition contains a surface adjusting agent, the content of the surface adjusting agent is preferably in a range of 0.01% to 1.00% by mass, more preferably in a range of 0.01% to 0.50% by mass, still more preferably in a range of 0.01% to 0.20% by mass, even still more preferably in a range of 0.02% to 0.10% by mass, particu-larly preferably in a range of 0.03% to 0.08% by mass, and more particularly preferably in a range of 0.03% to 0.07% by mass with respect to the total mass of the ink composition. When the content of the surface adjusting agent is in the above-described ranges, the friction fastness is likely to be further enhanced.

1.6 Dispersant

The non-aqueous ink jet ink composition according to the present embodiment may further contain a dispersant that disperses the bright pigment. The dispersant is not particu-larly limited, and examples thereof include an anionic dis-persant, a non-ionic dispersant, and a polymer dispersant.

The anionic dispersant is not particularly limited, and examples thereof include a formalin condensate of aromatic sulfonic acid, a formalin condensate of β-naphthalenesulfo-nic acid, a formalin condensate of alkylnaphthalenesulfonic acid, and a formalin condensate of creosote oil sulfonic acid.

The aromatic sulfonic acid is not particularly limited, and examples thereof include alkylnaphthalenesulfonic acid such as creosote oil sulfonic acid, cresol sulfonic acid, phenolsulfonic acid, β-naphtholsulfonic acid, methylnaph-thalenesulfonic acid, or butylnaphthalenesulfonic acid, a mixture of β-naphthalenesulfonic acid and β-naphtholsulfo-nic acid, a mixture of cresol sulfonic acid and 2-naphthol-6-sulfonic acid, and lignin sulfonic acid.

The non-ionic dispersant is not particularly limited, and examples thereof include an ethylene oxide adduct of phy-tosterol and an ethylene oxide adduct of cholestanol.

The polymer dispersant is not particularly limited, and examples thereof include a polyoxyalkylene amine com-pound, polyacrylic acid partial alkyl ester, polyalkylene polyamine, polyacrylate, a styrene-acrylic acid copolymer, and a vinyl naphthalene-maleic acid copolymer. Examples of a commercially available product of the polyoxyalkylene amine compound include JEFFAMINE M2070 (manufac-tured by Huntsman Corporation) and GENAMIN (M41/2000) (manufactured by Clariant AG).

1.7 Other Components

Various additives such as a surfactant, a dissolution assis-tant, a viscosity adjusting agent, a pH adjusting agent, an antioxidant, a preservative, a fungicide, a corrosion inhibi-tor, and a chelating agent for capturing metal ions affecting dispersion can be appropriately added to the non-aqueous ink jet ink composition according to the present embodi-ment.

2. Recording Method

A recording method according to an embodiment of the present disclosure includes a step of jetting the above-described non-aqueous ink jet ink composition using an ink jet method and making the ink composition adhere to a recording medium (ink adhesion step).

According to the recording method of the present embodi-ment, since the above-described non-aqueous ink jet ink composition that is capable of maintaining moderate adhe-siveness of the ink to the recording medium, reducing unevenness due to swelling of the recording medium, and setting the drying speed of the ink to be appropriate is used, an image with high glossiness and satisfactorily reduced unevenness can be printed.

2.1 Ink Adhesion Step

The ink adhesion step is a step of making the above-described non-aqueous ink jet ink composition adhere to the recording medium using an ink jet method. The ink com-position can be jetted by the ink jet method using a known ink jet recording device. As the jetting method, a piezo method, a method of jetting the ink using bubbles generated by heating the ink, or the like can be used.

Recording Medium

The recording medium is not particularly limited, and examples thereof include an absorbing recording medium a low-absorbing recording medium, and a non-absorbing recording medium. Among these, a low-absorbing recording medium and a non-absorbing recording medium are prefer-able for the applications of non-aqueous inks.

The absorbing recording medium is not particularly lim-ited, and examples thereof include plain paper such as electrophotographic paper with high permeability of an ink composition, ink jet paper (paper used exclusively for ink jet which includes an ink absorbing layer formed of silica particles or alumina particles or an ink absorbing layer formed of a hydrophilic polymer such as polyvinyl alcohol (PVA) or polyvinylpyrrolidone (PVP)), and a recording medium including a support consisting of paper.

The ink low-absorbing or non-absorbing recording medium denotes a recording medium having a property of not absorbing an ink composition or hardly absorbing an ink composition. Quantitatively, the ink non-absorbing or low-absorbing recording medium denotes "recording medium in which the water absorption amount from the start of contact to 30 msec$^{1/2}$ in the Bristow method is 10 mL/m$^2$ or less". The Bristow method is a method that has been widely used as a method of measuring the liquid absorption amount in a short time and that is also adopted by Japan Technical Association of The Pulp And Paper Industry (JAPAN TAPPI). The details of the test method are described in Standard No. 51 "Paper and Paperboard, Liquid Absorbency Test Method, Bristow Method" of "Paper and Pulp Test Method (2000) by JAPAN TAPPI". Meanwhile, the absorbing recording medium denotes a recording medium that does not correspond to the ink non-absorbing or low-absorbing recording medium.

Examples of the ink non-absorbing recording medium include a plastic film that does not have an ink absorbing layer, a medium obtained by coating a base material such as paper with plastic, and a medium obtained by bonding a plastic film onto a base material such as paper. Examples of the plastic here include polyvinyl chloride, polyethylene terephthalate, polycarbonate, polystyrene, polyurethane, polyethylene, and polypropylene.

Further, examples of the ink low-absorbing recording medium include a recording medium provided with a coating layer for allowing the surface to receive the ink. When the base material is paper, examples of the recording medium include actual printing paper such as art paper, coated paper, and matte paper. Further, when the base material is a plastic film, examples thereof include a recording medium obtained by coating the surface of polyvinyl chloride, polyethylene terephthalate, polycarbonate, polystyrene, polyurethane, polyethylene, polypropylene, or the like with a hydrophilic polymer, and a recording medium obtained by coating the surface of the base material with particles of silica, titanium, or the like together with a binder.

Further, an ink non-absorbing or low-absorbing recording medium such as glass or a plate formed of metals such as iron, silver, copper, and aluminum can be used in addition to the above-described recording media.

2.2 Other Steps

Colored Ink Adhesion Step

The recording method according to the present embodiment may include a step of jetting a colored ink composition containing a coloring material using an ink jet method and making the ink composition adhere to the recording medium (colored ink adhesion step).

The order of performing the ink adhesion step and the colored ink adhesion step is not particularly limited, but it is preferable that the colored ink adhesion step be performed after the ink adhesion step. Further, the non-aqueous ink jet ink composition and the colored ink composition may be made to adhere to different places of the recording medium or adhere to the same place in an overlapping manner, and it is preferable that the non-aqueous ink jet ink composition and the colored ink composition be made to adhere to the same place of the recording medium.

The colored ink composition can be the same as the non-aqueous ink jet ink composition in terms of the components to be contained, the composition, and the like except that the colored ink composition contains a coloring material in place of the bright pigment.

The colored ink composition contains a coloring material. Examples of the coloring material include a pigment and a dye. Examples of the pigment include an inorganic pigment and an organic pigment. Examples of the dye include an acidic dye, a reactive dye, and a direct dye. Further, a coloring material that does not contain the above-described bright pigment is used as the coloring material.

The inorganic pigment is not particularly limited, and examples thereof include carbon blacks such as furnace black, lamp black, acetylene black, and channel black, and white inorganic oxides such as iron oxide, titanium oxide, zinc oxide, and silica.

Examples of the carbon blacks include C.I. (Colour Index Generic Name) Pigment Black 1, 7, and 11. Commercially available products may be used as the carbon blacks, and examples thereof include No. 2300, No. 900, MCF88, No. 33, No. 40, No. 45, No. 52, MA7, MA8, MA100, and No. 2200B (manufactured by Mitsubishi Chemical Corporation), Raven (registered trademark) 5750, 5250, 5000, 3500, 1255, and 700 (manufactured by Columbia Carbon Company), Regal (registered trademark) 400R, 330R, 660R, Mogul (registered trademark) L, Monarch (registered trademark) 700, 800, 880, 900, 1000, 1100, 1300, and 1400 (manufactured by Cabot Corporation), and Color Black FW1, FW2, FW2V, FW18, FW200, 5150, 5160, 5170, Printex (registered trademark) 35, U, V, 140U, and Special Black 6, 5, 4A, and 4 (manufactured by Degussa AG).

Examples of the organic pigment include a quinacridone-based pigment, a quinacridone quinone-based pigment, a dioxazine-based pigment, a phthalocyanine-based pigment, an anthrapyrimidine-based pigment, an anthanthrone-based pigment, an indanthrone-based pigment, a flavanthrone-based pigment, a perylene-based pigment, a diketopyrrolo-pyrrole-based pigment, a perinone-based pigment, a quinophthalone-based pigment, an anthraquinone-based pigment, a thioindigo-based pigment, a benzimidazolone-based pigment, an isoindolinone-based pigment, an azomethine-based pigment, and an azo-based pigment.

Specific examples of the organic pigment include the followings.

Examples of a cyan pigment include C.I. Pigment Blue 1, 2, 3, 15:3, 15:4, 15:34, 16, 22, and 60, and C.I. Vat Blue 4 and 60, and preferred examples thereof include a mixture of one or two or more kinds of pigments selected from the group consisting of C.I. Pigment Blue 15:3, 15:4, and 60.

Examples of a magenta pigment include C.I. Pigment Red 5, 7, 12, 48 (Ca), 48 (Mn), 57 (Ca), 57:1, 112, 122, 123, 168, 184, and 202, and C.I. Pigment Violet 19, and preferred examples thereof include a mixture of one or two or more kinds of pigments selected from the group consisting of C.I. Pigment Red 122, 202, and 209, and C.I. Pigment Violet 19.

Examples of a yellow pigment include C.I. Pigment Yellow 1, 2, 3, 12, 13, 14C, 16, 17, 73, 74, 75, 83, 93, 95, 97, 98, 119, 110, 114, 128, 129, 138, 150, 151, 154, 155, 180, and 185, and preferred examples thereof include a mixture of one or two or more kinds of pigments selected from the group consisting of C.I. Pigment Yellow 74, 109, 110, 128, 138, 150, and 180.

Further, a pigment of a color other than the above-described colors can be used. Examples thereof include an orange pigment and a green pigment.

The pigment may be used alone or in combination of two or more kinds thereof.

Further, it is preferable that the pigment be subjected to a surface treatment or blended with a dispersant or the like in order to increase the dispersibility of the pigment in the colored ink composition.

Further, the colored ink composition and the above-described non-aqueous ink jet ink composition may be an ink set used for recording. Here, "ink set" denotes a set of two or more inks used for recording. The inks of the ink set may be accommodated in separate ink housing bodies for each ink or may be accommodated in an integrated ink housing body. The ink set includes at least one (one kind) of the above-described non-aqueous ink jet ink compositions and at least one (one kind) of the colored ink compositions.

Primary Heating Step

The recording method according to the present embodiment may include a primary heating step of heating the ink composition adhered to the recording medium at an early stage.

The primary heating step is a step of heating the ink adhered to the recording medium at an early stage and drying the ink. The primary heating is a heating step for drying at least a part of a liquid medium of the ink adhered to a recording medium at least to an extent that the flow of the ink is reduced.

The primary heating step may be performed such that the ink adheres to a heating recording medium or the ink is heated at an early stage after the adhesion. It is preferable that the ink droplets having landed on the recording medium start heating at the latest 0.5 seconds after the landing of the ink droplets.

It is preferable that the primary heating step be performed by irradiating the recording medium with an IR heater or a microwave or blowing hot air to the recording medium using a platen heater or a fan.

The heating in the primary heating step may be performed at least at any timing of before the ink adhesion step, simultaneously with the adhesion, or early after the adhesion, and it is preferable that the heating be performed simultaneously with the adhesion. In this heating order, the ink adhesion step can be performed. It is particularly preferable that the recording medium be heated and the ink composition adhere to the heated recording medium in the ink adhesion step.

When the recording method includes the primary heating step, since the ink composition on the recording medium can be rapidly dried, occurrence of bleeding of the ink can be prevented, which is preferable. Meanwhile, when the recording method includes the primary heating step, since the ink is rapidly dried, gloss may deteriorate due to insufficient ensuring of the time for leafing of the bright pigment or the jetting stability may deteriorate due to receiving the heat of the primary heating step. However, according to the recording method of the present embodiment, it is preferable that the above-described non-aqueous ink jet ink composition be used even when the primary heating step is performed from the viewpoint of obtaining excellent gloss or excellent jetting stability.

The surface temperature of the recording surface of the recording medium in the primary heating step of heating the ink composition is preferably 30° C. or higher and 60° C. or lower, more preferably 35° C. or higher and 55° C. or lower, and still more preferably 40° C. or higher and 50° C. or lower. It is preferable that the surface temperature of the recording medium be in the above-described ranges from the viewpoint of preventing bleeding and further improving the jetting stability. Further, the surface temperature of the recording medium in the primary heating step is the surface temperature of the recording medium when the ink adheres to the recording medium or the temperature of the recording medium during heating when the recording medium is heated after the adhesion. Further, the surface temperature of the recording medium is a maximum temperature during recording.

Post-Heating Step

The recording method according to the present embodiment may include a post-heating step (secondary heating step) of heating the recording medium after the ink adhesion step.

The post-heating step is a heating step of completing recording and sufficiently heating the recording medium to the extent that the recorded material can be used. The post-heating step is a heating step for sufficiently drying a solvent component of the ink.

It is preferable that the post-heating step be started longer than 0.5 seconds after the adhesion of the ink to the recording medium. For example, it is preferable that a recording region where the recording medium is present start heating longer than 0.5 seconds after completion of the adhesion of the ink to the recording region.

The recording medium in the post-heating step can be performed by using, for example, an appropriate heating unit. The surface temperature of the recording medium in this case is preferably 50° C. or higher, more preferably 60° C. or higher, still more preferably 70° C. or higher, and even still more preferably 75° C. or higher. The upper limit thereof is not limited, but is preferably 120° C. or lower. Further, the heating temperature is preferably lower than or equal to the softening point of the base material of the recording medium.

2.3 Recording Device

An example of a recording device that can be suitably used for the recording method according to the present embodiment will be described below with reference the accompanying drawing.

Outline of Device Configuration

FIGURE is a schematic cross-sectional view schematically showing a recording device. As shown in FIGURE, an ink jet recording device 1 includes a recording head 2, an IR heater 3, a platen 4, a heating heater 5, a cooling fan 6, a preheater 7, and a ventilation fan 8. Further, the recording head is mounted on a carriage (not shown) and performs main scanning in a front-rear direction of the FIGURE so that the ink adheres to a recording medium M. Further, the platen 4 is provided with a platen heater (not shown). The ink jet recording device 1 includes a control unit (not shown) and performs recording by controlling each unit. Further, the ink is supplied to the recording head 2 from an ink housing body (not shown).

Configuration Related to Ink Jet Head

The recording head 2, which is an ink jet head, is configured to perform recording on the recording medium M by jetting the ink composition from a nozzle of the recording head 2 to adhere to the recording medium M. The recording head 2 shown in FIG. 1s a serial type recording head and performs scanning on the recording medium M a plurality of times relatively in a main scanning direction so that the ink adheres to the recording medium M. The recording head 2 is mounted on the carriage (not shown). The recording head 2 performs scanning on the recording medium M a plurality of times relatively in a main scanning direction by an operation of a carriage moving mechanism that allows the carriage to move in a medium width direction (front-rear direction of the FIGURE) of the recording medium M. The medium width direction is a main scanning direction of the recording head 2. The scanning carried out in the main scanning direction is also referred to as main scanning.

Here, the main scanning direction is a direction in which the carriage on which the recording head 2 is mounted moves. In FIGURE, the main scanning direction is a direction intersecting a sub-scanning direction which is a transport direction of the recording medium M indicated by an arrow SS. Further, an image is recorded on the recording medium M by repeatedly performing main scanning on the recording head 2 and sub-scanning which is the transport of the recording medium M a plurality of times.

The ink composition can be jetted from the recording head 2 using a known method of the related art. For example, a method of jetting liquid droplets using vibration of a piezoelectric element, that is, a jetting method of forming ink droplets by mechanical deformation of an electrostrictive element is used.

Primary Heating Mechanism

The ink jet recording device 1 may include a primary heating mechanism that performs the primary heating step of heating the recording medium M when the ink is jetted from the recording head 2 and made to adhere to the recording medium. As the primary heating mechanism, a conduction type heating mechanism, a blast type heating mechanism, a radiation type heating mechanism, or the like can be used. The conduction type heating mechanism conducts heat from a member in contact with the recording medium to the recording medium. Examples thereof include a platen heater. Further, the platen heater is not shown in the FIGURE, but is integrated with the platen 4. The blast type heating mechanism dries the ink by sending normal temperature air or hot air to the recording medium. Examples thereof include a blast fan. The radiation type heating mechanism heats the recording medium by radiating radiation that generates heat to the recording medium. Examples thereof include IR radiation. Although not shown, a heater similar to the platen heater may be provided on a downstream of the platen 4 in the SS direction. These primary heating mechanisms may be used alone or in combination.

For example, the ink jet recording device includes the IR heater 3 and the platen heater as the primary heating mechanism.

Further, when the IR heater 3 is used, the recording medium M can be heated in a radiation manner by infrared rays radiated from the recording head 2 side. In this manner, the recording head 2 is also likely to be heated simultaneously, but the recording medium M can be heated without being affected by the thickness of the recording medium M as compared to when the recording medium M is heated from the rear surface thereof using the platen heater or the like. Further, the primary heating mechanism may include various fans (such as the ventilation fan 8) that apply hot air or air at the same temperature as the temperature of the environment to the recording medium M to dry the ink on the recording medium M.

The platen heater can heat the recording medium M at a position opposing to the recording head 2 via the platen 4. The platen heater is capable of heating the recording medium M in a conduction manner and is used as necessary in the ink jet recording method.

Further, the ink jet recording device 1 may include the preheater 7 that heats the recording medium M in advance before the ink adheres to the recording medium M.

Post-Heating Mechanism

The ink jet recording device may also include a post-heating mechanism that performs the post-heating step of heating the recording medium after the ink adhesion step and drying and fixing the ink.

The heating heater 5 used for the post-heating mechanism dries and solidifies the ink adhered to the recording medium M. When the heating heater 5 heats the recording medium M on which an image has been recorded, the solvent and the like contained in the ink can be more rapidly evaporated and scattered. In this manner, a recorded material can be obtained in a shorter time.

Other Configurations

The ink jet recording device 1 may include the cooling fan 6. An ink coating film can be formed on the recording medium M with excellent adhesiveness by drying the ink recorded on the recording medium M and cooling the ink on the recording medium M with the cooling fan 6.

The recording device shown in FIG. 1s a serial printer that performs so-called serial type recording. The recording device may be a line printer that includes a line head and performs line type recording.

The line head includes a line array in which a plurality of nozzles are arranged in the width direction of the recording medium and has a length greater than or equal to the width of the recording medium M to be transported, and thus an image can be recorded at once on the recording medium M to be transported in the width direction of the recording medium. Further, recording can be performed by one scanning. In addition, recording performed by scanning twice or more times can be carried out by performing scanning once performed by transporting the recording medium, returning the recording medium in a direction opposite to the transport direction, transporting the recording medium again, and performing scanning again.

Further, the scanning may be performed by the head in which the position with respect to the recording medium to be transported is fixed or the scanning may be performed while the head moves with respect to the recording medium fixed in the platen region.

Further, a recording device capable of performing line type recording can be configured as shown in FIGURE except that the recording head 2 is changed to a line head. Specifically, the heating mechanisms such as the ventilation fan 8, the IR heater 3, the platen heater, and the preheater 7 above the recording head 2 shown in FIGURE may be similarly provided above or below the line head. Further, the recording device may include the heating heater 5 serving as a post-heating mechanism shown in FIGURE, the cooling fan 6, and the like.

3. Examples

Hereinafter, the present disclosure will be described in more detail based on examples, but the present disclosure is not limited to such examples. Hereinafter, "%" is on a mass basis unless otherwise specified.

3.1 Preparation of Non-Aqueous Ink Jet Ink Composition

Components were placed in a container to have the composition listed in Tables 1 and 2 and sufficiently mixed and stirred, thereby obtaining a non-aqueous ink jet ink composition according to each example and each comparative example. The numerical values of the compositions listed in Tables 1 and 2 are in units of % by mass, and the total amount thereof is 100.0% by mass. Further, the bright pigment is a solid content, and a pigment dispersion liquid produced by the following method in advance was used.

Method of Producing Pigment Dispersion Liquid

First, a polyethylene terephthalate film having a smooth surface with a surface roughness Ra of 0.02 μm or less was prepared. Next, a release layer was formed on one entire surface of the film by coating the surface with a release resin solubilized by acetone using a roll coater. The polyethylene terephthalate film on which the release layer had been formed was transported into a vacuum deposition device at a speed of 5 m/s to form a film formed of Al with a thickness of 15 nm under reduced pressure. Next, the polyethylene terephthalate film on which the Al film had been formed was immersed in tetrahydrofuran, and ultrasonic vibration at 40 kHz was applied thereto, thereby obtaining a dispersion liquid of metal powder as an aggregate of metal particles made of Al.

The tetrahydrofuran was removed by a centrifuge, and diethylene glycol diethyl ether (DEDG) was added thereto, thereby obtaining a suspension with a metal powder content of 5% by mass. Next, the suspension was treated with a circulation type high-output ultrasonic crusher so that the metal particles were crushed until the particle diameter reached 0.5 μm. Ultrasonic waves at 20 kHz were applied in the treatment.

Next, an amine-based dispersant (JEFFAMINE M2070) was added to the suspension to pre-disperse the metal particles.

Further, phosphoric acid monostearyl ester, which is phosphoric acid alkyl ester, was added to the suspension as a surface treatment agent. Next, the suspension was irradiated with ultrasonic waves at 40 kHz for 1 hour for additional dispersion and filtered through a filter to remove coarse particles, thereby obtaining a metal pigment dispersion liquid.

TABLE 1

| | | | Example 1 | Example 2 | Example 3 | Example 4 | Example 5 | Example 6 | Example 7 | Example 8 | Example 9 |
|---|---|---|---|---|---|---|---|---|---|---|---|
| Bright pigment | Al pigment | | 1.2 | 1.2 | 1.2 | 1.2 | 1.2 | 1.2 | 1.2 | 1.2 | 1.2 |
| | | f.p.(° C.) | | | | | | | | | |
| Glycol monoether A | MFDG | 79 | 20 | 30 | 30 | 40 | 20 | 20 | 20 | 20 | 20 |
| | BPG | 62 | | | | | | | | | |
| | BMG | 63 | | | | | | | | | |
| | MMB | 68 | | | | | | | | | |
| Glycol monoether B | BTGH | 156 | 8 | 5 | 14 | 14 | | | | | |
| | MtetG | 126 | | | | | 10 | | | | |
| | MFTG | 118 | | | | | | 10 | | | |
| | EHDG | 137 | | | | | | | 10 | | |
| | PhDG | 141 | | | | | | | | 10 | |
| | MTG | 95 | | | | | | | | | 10 |
| Solvent | GBL | 101 | 5 | 5 | 5 | 5 | 5 | 5 | 5 | 5 | 5 |
| | DEDG | 71 | 65.4 | 58.4 | 49.4 | 39.4 | 63.4 | 63.4 | 63.4 | 63.4 | 63.4 |
| Resin | PARALOID B60 | | 0.3 | 0.3 | 0.3 | 0.3 | 0.3 | 0.3 | 0.3 | 0.3 | 0.3 |
| Surface adjusting agent | BYK-333 | | 0.1 | 0.1 | 0.1 | 0.1 | 0.1 | 0.1 | 0.1 | 0.1 | 0.1 |
| | Total content (A + B) | | 28 | 35 | 44 | 54 | 30 | 30 | 30 | 30 | 30 |
| | Mass ratio (A/B) | | 2.5 | 6.0 | 2.1 | 2.9 | 2.0 | 2.0 | 2.0 | 2.0 | 2.0 |
| Evaluation | Glossiness | 20 degrees | 668 | 658 | 660 | 660 | 638 | 613 | 637 | 635 | 621 |
| | | | A | A | A | A | A | A | A | A | A |
| | | 60 degrees | 471 | 468 | 469 | 469 | 465 | 460 | 465 | 466 | 462 |
| | | | A | A | A | A | A | A | A | A | A |
| | Unevenness | 40° C. | A | A | B | B | A | A | A | A | A |
| | | 50° C. | A | A | A | A | A | A | A | A | A |

TABLE 2

| | | f.p.(° C.) | Example 10 | Example 11 | Example 12 | Example 13 | Example 14 | Example 15 | Comparative Example 1 | Comparative Example 2 | Comparative Example 3 | Comparative Example 4 |
|---|---|---|---|---|---|---|---|---|---|---|---|---|
| Bright pigment | Al pigment | | 1.2 | 1.0 | 2.0 | 1.2 | 1.2 | 1.2 | 1.2 | 1.2 | 1.2 | 1.2 |
| Glycol monoether A | MFDG | 79 | 20 | 10 | 10 | | | 12 | 10 | 20 | 0 | 50 |
| | BPG | 62 | | 10 | 10 | | | | | | | |
| | BMG | 63 | | | | 30 | | | | | | |
| | MMB | 68 | | | | 10 | 30 | | | | | |
| Glycol monoether B | BTGH | 156 | 5 | 5 | 5 | 8 | 8 | 10 | 4 | 0 | 20 | 20 |
| | MtetG | 126 | | | | | | | | | | |
| | MFTG | 118 | | | | | | | | | | |
| | EHDG | 137 | | | | | | | | | | |
| | PhDG | 141 | 5 | | | | | | | | | |
| | MTG | 95 | | | | | | | | | | |
| Solvent | GBL | 101 | 5 | 5 | 5 | 5 | 5 | 5 | 5 | 5 | 6 | 5 |
| | DEDG | 71 | 63.4 | 68.6 | 57.6 | 55.4 | 55.4 | 71.4 | 79.4 | 73.4 | 72.4 | 23.4 |

TABLE 2-continued

| | | Example 10 | Example 11 | Example 12 | Example 13 | Example 14 | Example 15 | Comparative Example 1 | Comparative Example 2 | Comparative Example 3 | Comparative Example 4 |
|---|---|---|---|---|---|---|---|---|---|---|---|
| Resin | PARALOID B60 | 0.3 | 0.3 | 0.3 | 0.3 | 0.3 | 0.3 | 0.3 | 0.3 | 0.3 | 0.3 |
| Surface adjusting agent | BYK-333 | 0.1 | 0.1 | 0.1 | 0.1 | 0.1 | 0.1 | 0.1 | 0.1 | 0.1 | 0.1 |
| | Total content (A + B) | 30 | 25 | 35 | 38 | 38 | 22 | 14 | 20 | 20 | 70 |
| | Mass ratio (A/B) | 2.0 | 4.0 | 6.0 | 3.8 | 3.8 | 1.2 | 2.5 | — | 0.0 | 2.5 |
| Evaluation | Glossiness 20 degrees | 642 | 623 | 605 | 615 | 601 | 655 | 575 | 540 | 625 | 621 |
| | | A | A | B | B | B | A | C | C | A | A |
| | 60 degrees | 466 | 463 | 460 | 465 | 459 | 468 | 450 | 441 | 459 | 457 |
| | | A | A | A | A | A | A | B | B | A | A |
| | Unevenness 40° C. | A | A | A | A | A | A | A | A | C | D |
| | 50° C. | A | A | A | A | A | A | A | A | B | C |

The components listed in Tables 1 and 2 will be described.

Composition

Bright Pigment

The volume average particle diameter (D50) of the bright pigment was 0.5 μm, and the average thickness thereof was 15 nm. Further, the volume average particle diameter (D50) was measured by using MICROTRAC MT-3300 (manufactured by MicrotracBEL Corp., laser diffraction scattering type particle size distribution measuring device). Further, the average thickness is a value obtained by performing measurement on any 50 particles of the metal pigment using an atomic force microscope NanoNaviE-Sweep (manufactured by SII Nano Technology Inc.) according to an atomic microscope method and averaging the measured values.

Glycol Monoether A

MFDG (dipropylene glycol monomethyl ether, normal boiling point: 189.6° C., surface tension: 28.8 mN/m)

BPG (propylene glycol monobutyl ether, normal boiling point: 170.2° C., surface tension: 26.8 mN/m)

BMG (methylene glycol monobutyl ether, normal boiling point: 171° C., surface tension: 26.5 mN/m)

MMB (3-methoxy-3-methyl butanol, normal boiling point: 174° C., surface tension: 29.9 mN/m)

Glycol Monoether B

BTGH (tetraethylene glycol monobutyl ether, normal boiling point: 290° C., surface tension: 34.5 mN/m)

MtetG (tetraethylene glycol monomethyl ether, normal boiling point: 285° C., surface tension: 34.7 mN/m)

MFTG (tripropylene glycol monomethyl ether, normal boiling point: 271° C., surface tension: 30.8 mN/m)

EHDG (diethylene glycol ethyl hexyl ether, normal boiling point: 302° C., surface tension: 31.7 mN/m)

PhDG (dipropylene glycol phenyl ether, normal boiling point: 309° C., surface tension: 40.1 mN/m)

MTG (triethylene glycol monomethyl ether, normal boiling point: 233.9° C., surface tension: 33.4 mN/m)

[Other Components]

GBL (γ-butyrolactone, normal boiling point: 200° C., surface tension: 41 mN/m)

DEDG (diethylene glycol diethyl ether, normal boiling point: 188° C., surface tension: 26.9 mN/m)

PARALOID B60 (trade name, manufactured by Dow Chemical Company, acrylic resin)

BYK-333 (trade name, manufactured by BYK Additives & Instruments, silicon-based surface adjusting agent, polyether-modified silicon-based compound)

Terms

"Glycol monoether A" is a compound represented by Formula (1) and having a flash point of 85° C. or lower.

"Glycol monoether B" is a compound represented by Formula (1) and having a flash point of 95° C. or higher.

$$R_1—(O—R_2)_n—OH \qquad \text{Formula (1)}$$

(In Formula (1), $R_1$ represents an alkyl group having 1 to 8 carbon atoms or a phenyl group, $R_2$ represents an alkylene group having 1 to 5 carbon atoms, and n represents an integer of 1 to 4.)

"f.p." denotes a flash point.

"Total content (A+B)" denotes the total content of the glycol monoether A and the glycol monoether B with respect to the total amount of the ink composition.

"Mass ratio (A/B)" denotes the ratio of the content of the glycol monoether A to the content of the glycol monoether B.

"20 degrees" in glossiness denotes measurement of glossiness in a case of reflection on the recording surface at 20 degrees.

"60 degrees" in glossiness denotes measurement of glossiness in a case of reflection on the recording surface at 60 degrees.

The temperatures "40° C." and "50° C." in unevenness denotes temperatures of a heater located on the opposite side of the ink jet head during printing.

3.2 Recording Conditions

The non-aqueous ink jet ink composition obtained above was filtered and degassed, and an ink pack was filled with the ink composition and mounted on an ink jet printer ("SC-S80650", manufactured by Seiko Epson Corporation) as a metallic ink. Further, among commercially available color inks, particularly a yellow ink ("SC10Y70", manufactured by Seiko Epson Corporation) or a light cyan ink ("SC10LC70", manufactured by Seiko Epson Corporation) was similarly mounted on the printer as a colored ink composition. Vinyl chloride (Orajet-3165G) was used as a printing medium.

The printed image was a pattern image obtained by preparing image data (resolution 1440 dpi) in which overlapping of the metallic printing and the color printing was converted into data and coating the entire surface of the underlying metallic layer, and a recorded material was obtained by printing the colors of the upper layer into a 1 cm square pattern and a 1 to 3 mm fine line. A nozzle usage rate of duty 70% was employed for the underlying metallic printing, and a pattern in which the nozzle usage rate was changed to 20% to 100% was used for the color inks of the upper layer. Further, the printing temperature (heater temperature immediately below the printing head) was set at two levels of 40° C. and 50° C. to determine the drying properties of the ink. Here, the printing temperature was set to 40° C. in the recording material used for evaluating the glossiness.

3.3 Evaluation Method 3.3.1 Glossiness (20 Degrees)

The glossiness of the recorded material obtained above was measured using a gloss meter MULTI Gloss 268 (manufactured by Konica Minolta, Inc.) in a case of reflection on the recording surface at 20°, and the glossiness was evaluated according to the following criteria.

Evaluation Criteria

A: 620 or greater

B: 580 or greater and less than 620

C: less than 580

3.3.2 Glossiness (60 Degrees)

The glossiness of the recorded material obtained above was measured using a gloss meter MULTI Gloss 268 (manufactured by Konica Minolta, Inc.) in a case of reflection on the recording surface at 60°, and the glossiness was evaluated according to the following criteria.

Evaluation Criteria

A: 455 or greater

B: less than 455

3.3.3 Unevenness (40° C.)

The image quality of the color inks of the upper layer in the recorded material obtained above by setting the printing temperature to 40° C. was observed with a microscope, and the crying properties of the metallic color was evaluated according to the following criteria. Further, since a difference in drying properties preferentially appeared in the pattern in which an ink of a bright yellow color was formed on the metallic layer, a tint of the yellow color and a coffee stain phenomenon, which was a problem when the coloring material was dried, were determined.

Evaluation Criteria

A: Unevenness and dullness of the yellow color were not found in all colors, which was satisfactory B: Dullness (considered that the underlying metallic layer was redissolved) was found in the color (yellow)

C: Dullness in the color (yellow) and color unevenness due to the coffee stain phenomenon appeared D: Dullness and the coffee stain phenomenon were found even in the colors other than yellow.

3.3.4 Unevenness (50° C.)

The evaluation was performed by the same method according to the same criteria as in "Unevenness (40° C.) described above except that the printing temperature was set to 50° C.

3.4 Evaluation Results

The evaluation results are listed in Tables 1 and 2.

In all the non-aqueous ink jet ink composition of the examples according to the present disclosure, both the satisfactory glossiness and the satisfactory property of reducing unevenness were achieved at the same time. On the contrary, in all the ink compositions of the comparative examples to which the present disclosure had not been applied, at least one of the glossiness or the unevenness was deteriorated.

The following contents are derived from the embodiments described above.

According to one aspect, a non-aqueous ink jet ink composition is an ink composition containing a bright pigment, and glycol monoether A and glycol monoether B that are represented by Formula (1) and have flash points different from each other, in which the glycol ether A has a flash point of 85° C. or lower, the glycol monoether B has a flash point of 95° C. or higher, a total content of the glycol monoether A and the glycol monoether B is in a range of 20% to 60% by mass with respect to a total amount of the ink composition, and the content of the glycol monoether A is greater than the content of the glycol monoether B.

$$R_1—(O—R_2)_n—OH \qquad \text{Formula (1)}$$

(In Formula (1), $R_1$ represents an alkyl group having 1 to 8 carbon atoms or a phenyl group, $R_2$ represents an alkylene group having 1 to 5 carbon atoms, and n represents an integer of 1 to 4.)

In one aspect of the non-aqueous ink jet ink composition described above, $R_2$ in Formula (1) that represents the glycol monoether A may represent an alkylene group having 3 carbon atoms.

In any one of the aspects of the non-aqueous ink jet ink composition described above, in which the glycol monoether B is tetraethylene glycol monobutyl ether.

The non-aqueous ink jet ink composition according to any one of the aspects described above may further contain an acrylic resin.

In any one of the aspects of the non-aqueous ink jet ink composition described above, the bright pigment may be subjected to a surface treatment with phosphoric acid alkyl ester.

The non-aqueous ink jet ink composition according to any one of the aspects described above may further contain glycol diether represented by Formula (2).

$$R_3O—(R_4O)_m—R_5 \qquad \text{Formula (2)}$$

(In Formula (2), $R_3$ and $R_5$ each independently represent an alkyl group having 1 to 4 carbon atoms, $R_4$ represents an alkylene group having 2 or 3 carbon atoms, and m represents an integer of 1 to 4.)

In any one of the aspects of the non-aqueous ink jet ink composition described above, the content of the glycol monoether A may be in a range of 15% to 55% by mass with respect to the total amount of the ink composition.

In any one of the aspects of the non-aqueous ink jet ink composition described above, the content of the glycol monoether B may be in a range of 5% to 15% by mass with respect to the total amount of the ink composition.

In any one of the aspects of the non-aqueous ink jet ink composition described above, a ratio (A/B) of the content of the glycol monoether A to the content of the glycol monoether B in terms of mass may be 1.8 or greater.

According to one aspect, a recording method includes jetting the non-aqueous ink jet ink composition according to any one of the aspects described above using an ink jet method and making the non-aqueous ink jet ink composition adhere to a recording medium.

The present disclosure is not limited to the above-described embodiments, and various modifications can be made. For example, the present disclosure has configurations that are substantially the same as the configurations described in the embodiments, for example, configurations with the same functions, the same methods, and the same results as described above or configurations with the same purposes and the same effects as described above. Further, the present disclosure has configurations in which parts that are not essential in the configurations described in the embodiments have been substituted. Further, the present disclosure has configurations exhibiting the same effects as the effects of the configurations described in the embodiments or configurations capable of achieving the same purposes as the purposes of the configurations described in the embodiments. Further, the present disclosure has configurations in which known techniques have been added to the configurations described in the embodiments.

What is claimed is:

1. A non-aqueous ink jet ink composition comprising:

a bright pigment that is either a metal pigment or a pearl pigment; and glycol monoether A and glycol monoether B that are represented by Formula (1) and have flash points different from each other, wherein the bright pigment is subjected to a surface treatment with a phosphoric acid alkyl ester, the glycol monoether A has a flash point of 85° C. or lower, the glycol monoether B has a flash point of 95° C. or higher, a total content of the glycol monoether A and the glycol monoether B is in a range of 20% to 60% by mass with respect to a total amount of the ink composition, and the content of the glycol monoether A is greater than the content of the glycol monoether B, $$R_1\text{—}(O\text{—}R_2)_n\text{—}OH \quad\quad \text{Formula (1)}$$

in Formula (1), $R_1$ represents an alkyl group having 1 to 8 carbon atoms or a phenyl group, $R_2$ represents an alkylene group having 1 to 5 carbon atoms, and n represents an integer of 1 to 4.

2. The non-aqueous ink jet ink composition according to claim 1, wherein $R_2$ in Formula (1) that represents the glycol monoether A represents an alkylene group having 3 carbon atoms.

3. The non-aqueous ink jet ink composition according to claim 1, wherein the glycol monoether B is tetraethylene glycol monobutyl ether.

4. The non-aqueous ink jet ink composition according to claim 1, further comprising:

an acrylic resin.

5. The non-aqueous ink jet ink composition according to claim 1, further comprising:

glycol diether represented by Formula (2), $$R_3O\text{—}(R_4O)_m\text{—}R_5 \quad\quad \text{Formula (2)}$$

in Formula (2), $R_3$ and $R_5$ each independently represent an alkyl group having 1 to 4 carbon atoms, $R_4$ represents an alkylene group having 2 or 3 carbon atoms, and m represents an integer of 1 to 4.

6. The non-aqueous ink jet ink composition according to claim 1, wherein the content of the glycol monoether A is in a range of 15% to 55% by mass with respect to the total amount of the ink composition.

7. The non-aqueous ink jet ink composition according to claim 1, wherein the content of the glycol monoether B is in a range of 5% to 15% by mass with respect to the total amount of the ink composition.

8. The non-aqueous ink jet ink composition according to claim 1, wherein a ratio (A/B) of the content of the glycol monoether A to the content of the glycol monoether B in terms of mass is 1.8 or greater.

9. A recording method comprising:

jetting the non-aqueous ink jet ink composition according to claim 1 using an ink jet method and making the non-aqueous ink jet ink composition adhere to a recording medium.

\* \* \* \* \*